US011132193B1

(12) United States Patent
Rosenbaum et al.

(10) Patent No.: US 11,132,193 B1
(45) Date of Patent: Sep. 28, 2021

(54) AUTOMATICALLY UPDATING DOCUMENTATION

(71) Applicant: S.T. Swimm Tech Ltd, Tel-Aviv (IL)

(72) Inventors: Omer Rosenbaum, Tel-Aviv (IL); Oren Toledano, Jerusalem (IL); Tom Ahi-Dror, Ramat Gan (IL); Gilad Navot, Tel-Aviv (IL)

(73) Assignee: S.T. Swimm Tech Ltd, Tel-Aviv (IL)

( * ) Notice: Subject to any disclaimer, the term of this patent is extended or adjusted under 35 U.S.C. 154(b) by 0 days.

(21) Appl. No.: 17/137,466

(22) Filed: Dec. 30, 2020

(51) Int. Cl.
*G06F 8/73* (2018.01)
*G06F 8/71* (2018.01)

(52) U.S. Cl.
CPC . *G06F 8/73* (2013.01); *G06F 8/71* (2013.01)

(58) Field of Classification Search
USPC ....................................................... 717/122
See application file for complete search history.

(56) References Cited

U.S. PATENT DOCUMENTS

| 6,256,773 B1* | 7/2001 | Bowman-Amuah | G06F 8/71 707/999.202 |
| 2019/0050814 A1* | 2/2019 | Surkov | G06T 11/20 |
| 2020/0379737 A1* | 12/2020 | Pezaris | G06F 8/77 |
| 2020/0379752 A1* | 12/2020 | Rodrigues Rosa Junior | G06F 8/71 |

* cited by examiner

*Primary Examiner* — John Q Chavis

(57) ABSTRACT

A method for updating documentation comprising: documenting a marked segment in a documentation object, the marked segment comprising at least part of a version of a source file managed by a file version control system (VCS), where the documentation object comprises a copy of the marked segment documented thereby; identifying in the VCS a new version of the source file, where the new version was added to the VCS after the version of the source file having the marked segment; performing an identification of when an updated segment in the new version, equivalent to the marked segment, is different from the marked segment; and in response to the identification: classifying the updated segment according to differences identified between the updated segment and the copy of the marked segment; and generating an updated documentation object by modifying the copy of the marked segment according to the classification and the identified differences.

16 Claims, 11 Drawing Sheets

500

501
Compute at least one source line change

503
Analyze the one or more documentation line changes

511
Classifying each of the one or more documentation line changes

515
Analyze the plurality of line-change classifications

```
0.1 Let hp be a copy of the marked segment in the version of the source file.
0.2 Let dpf be one or more differences identified between the updated segment and
the copy of the marked segment.
0.3 Let ui be an index in hp of upper inner context line.
0.4 Let li be an index in hp of lower inner context line.

0.5 Let hp consist of lines L = {l1, l2, ... , lk}.
0.6 Let inner hunk IH = {lj; l in L and ui <= j <=li}.

0.7 Let s be a sequence of characters {c1, c2, ... ck}.
0.8 Let the delinted form of s be { c in s: c is not a member of a set of delint
characters}, and every single-quote ' or ` transformed to double-quote ".

// For example - for the following sequence:
// ab'c;d e\nf
// The delinted form is:
// abcdef 1.      Let delinted-any-line be false.
2.      For every line Lh in IH:
2.1.    If the change type of Lh in hp is ADDITION: continue
2.2.    Let ldpf be the corresponding line in dpf.
2.3.    If the change type of ldpf in dpf is DELETION: continue
2.4.    Let a be the side a of lh.
2.5.    Let b be the side b of ldpf.
2.6.    If the delinted form of a is equal to the delinted form of b
2.6.1.         Set delinted-any-line to true
2.6.2.         Modify hp such that lha is set to delinted form of ldpfb
2.6.3.         Modify dpf such that Ldpfa is set to delinted from of ldpfb
2.6.4.         Modify dpf such that the change type of ldpf is context.
3.      Return delinted-Any-line
```

```
0.1 Let hp be a copy of the marked segment in the version of the source file.
0.2 Let dpf be one or more differences identified between the updated segment and
the copy of the marked segment.
0.3 Let ui be an index in hp of upper inner context line.
0.4 Let li be an index in hp of lower inner context line.

0.5 Let hp consist of lines L = {l1, l2, ... , lk}.
0.6 Let inner hunk IH = {lj; l in L and ui <= j <=li}.

// If the inner context line and upper context line have not been changed between
// the version and the new version, this module updates all of the lines between ui
// and li in hp to be the same as in the updated segment.
// If the line is deleted as part of hp and has been modified in the new version -
// it will be deleted in the updated version of hp.
// If a new line has been added in the new version - it will be deleted.
// If the line has been deleted in the new version - it will be
// excluded from hp.

1000. If (li - ui) < 2 return falsereturn false.
1001. Let ldpfui be the corresponding line of lui in dpf.
1002. Let ldpfli be the corresponding line of lli in dpf.
1003. if (the change type of ldpf is not CONTEXT) or (the change type of ldpf is not
CONTEXT) return false.
1004. Let indexH = ui
1005. Let indexD = index of ldpfui within dpf
1006. Let actual_line_number_ui be the actual line number of lui in fileA.
1007. Let actual_line_number_li be the actual line number of lli in fileA.
1008. For line_number in {actual_line_number_li,...,actual_line_number_ui}:
1008.1.      While the change type of lindexH of hp is ADDITION
1008.1.1.    indexH += 1
1008.2.      While (the change type of line lindexD of dpf is ADDITION) or  (the
actual line number of indexD of dpf equals line_number)
1008.2.1.    If the change type of line lindexD of dpf is CONTEXT - Break
1008.2.2.    If the change type of line lindexD of dpf is DELETION
1008.2.2.1. Remove lindexh from hp
1008.2.2.2. indexH -= 1
1008.2.3.    If the change type of line lindexD of dpf is UPDATE
1008.2.3.1. Modify the content of fileA of lindexH in hp to be the contents of fileB
of lindexD of dpf.
1008.2.4.    If the change type of line lindexD of dpf is ADDITION
1008.2.4.1. Add a line object to hp with a change type of DELETION, where the
content is that of fileB within line lindexD of dpf.
1008.2.4.2. indexH += 1
1008.2.5.    indexD += 1
1008.3.      indexH += 1
1008.4.      line_number += 1
1009. Return true
```

```
0.1 Let hp be a copy of the marked segment in the version of the source file.
0.2 Let dpf be one or more differences identified between the updated segment and
the copy of the marked segment.
0.3 Let ui be an index in hp of upper inner context line.
0.4 Let li be an index in hp of lower inner context line.

0.5 Let hp consist of lines L = {l1, l2, ... , lk}.
0.6 Let inner hunk IH = {lj; l in L and ui <= j <=li}.

2000. Let ldpfui be the corresponding line of lui in dpf.
2001. If ui equals li (there is only one change line within hp)
2001.1.     If the change type of lui is not UPDATE
2001.1.1.   Return false
2001.2.     Let rhc = ui
2002. Else
2002.1.     Let ldpfli  be the corresponding line of lli in dpf.
2002.2.     If (the change type of ldpfui is UPDATE) and (the change type of ldpfli
is CONTEXT)
2002.2.1.   Let rhc =ui
2002.3.     Else if (the change type of ldpfui is CONTEXT) and (the change type of
ldpfli is UPDATE)
2002.3.1.   Let rhc =li
2002.4.     Else
2002.4.1.   Return false
2003. Let ldpfrhc  be the corresponding line of lrhc in dpf.
2004. If  the change of ldpfrhc is a within-line-change
2004.1.     Modify the content of fileA of lrhc in hp to be the contents of fileB of
ldpfrhc of dpf.
2004.2.     Return true
2005. Return false
```

FIG. 8B ual files to describe one
AUTOMATICALLY UPDATING DOCUMENTATION

FIELD AND BACKGROUND OF THE INVENTION

Some embodiments described in the present disclosure relate to file documentation and, more specifically, but not exclusively, to documenting files in a development environment.

Textual files are used in a variety of fields to describe one or more structures of the field, where the textual file is formatted in an identified scheme of the field. One example is the field of software code development, where a source file of a software program is formatted according to a schema of a programming language or a data object, for example a JavaScript Object Notation (JSON) file. Another example is a repository of procedures, for example test protocols or customer service procedures, where a source file describes one or more procedures or protocols of a field. Yet another example is a repository of documents stored in an identified format, for example a Google Docs repository or a repository comprising documents in Microsoft Word format.

As used herein, the term documentation refers to text that accompanies a file, or part of a file, in order to describe the file or the part of the file for a human. Documentation may include one or more images in addition to, or instead of, the text. Some documentation explains a structure described by the file. Some documentation explains how to use the file or a system produced using the file. Some documentation explains how a procedure described by the file works. Some documentation explains how a system produced using the file works.

There exist environments where one or more of a plurality of files are modified over time, for example source code files in a development environment. In such environments, documentation text describing an early version of a file may no longer explain, or describe, correctly a later version of the file.

To preserve the relevance of documentation text to a file, or part of a file, described thereby, there is a need to update the documentation text in a manner synchronous with modifications to the file.

SUMMARY OF THE INVENTION

Some embodiments of the present disclosure describe a system and a method for automatically updating one or more source documentation objects documenting one or more segments of one or more source files.

The foregoing and other objects are achieved by the features of the independent claims. Further implementation forms are apparent from the dependent claims, the description and the figures.

According to a first aspect of the invention, a method comprises executing a code in a development environment comprising a file version control system (VCS) for: documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby; identifying in the VCS a new version of a source file of the plurality of source files, where the new version was added to the VCS after a version of the source file having a marked segment documented by a source documentation object of the plurality of source documentation objects; performing an identification of when an updated segment in the new version of the source file, equivalent to the marked segment, is different from the marked segment; and in response to the identification: classifying the updated segment as one of a set of change classifications according to one or more differences identified between the updated segment and the copy of the marked segment; and subject to the change classification being a member of a set of updatable changes, generating an updated source documentation object by modifying the copy of the marked segment according to the change classification and the one or more differences. Generating the updated source documentation object according to the change classification in addition to the one or more differences increases accuracy of the updated source documentation object compared to generating the updated source documentation object according to the one or more differences alone.

According to a second aspect of the invention, an apparatus comprises at least one hardware processor configured for executing a code in a development environment comprising a file version control system (VCS) for: documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby; identifying in the VCS a new version of a source file of the plurality of source files, where the new version was added to the VCS after a version of the source file having a marked segment documented by a source documentation object of the plurality of source documentation objects; performing an identification of when an updated segment in the new version of the source file, equivalent to the marked segment, is different from the marked segment; and in response to the identification: classifying the updated segment as one of a set of change classifications according to one or more differences identified between the updated segment and the copy of the marked segment; and subject to the change classification being a member of a set of updatable changes, generating an updated source documentation object by modifying the copy of the marked segment according to the change classification and the one or more differences.

According to a third aspect of the invention, a software program product for a development environment comprises: a non-transitory computer readable storage medium; first program instructions for documenting each of a plurality of marked segments in one of a plurality of source documentation objects associated therewith, each marked segment comprising at least part of one of a plurality of versions of one of a plurality of source files managed by a VCS, where each source documentation object comprises a copy of the marked segment documented thereby; second program instructions for identifying in the VCS a new version of a source file of the plurality of source files, where the new version was added to the VCS after a version of the source file having a marked segment documented by a source documentation object of the plurality of source documentation objects; third program instructions for performing an identification of when an updated segment in the new version of the source file, equivalent to the marked segment, is different from the marked segment; and fourth program instructions for in response to the identification: classifying the updated segment as one of a set of change classifications according to one or more differences identified between the updated segment and the copy of the marked segment; and subject to the change classification being a member of a set of updatable changes, generating an updated source documentation object by modifying the copy of the marked segment according to the change classification and the one or more differences; and the first, second, third and fourth program instructions are executed by at least one computerized processor from the non-transitory computer readable storage medium.

With reference to the first and second aspects, in a first possible implementation of the first and second aspects of the present invention the plurality of source documentation objects is organized in at least one documentation file each having a plurality of documentation versions, the plurality of documentation versions of the at least one documentation file are managed by another VCS, and each documentation version of the at least one documentation file in the other VCS is associated with a version of at least one of the plurality of source files in the VCS. Organizing the plurality of documentation objects in at least one documentation file allows using existing VCS solutions to manage the plurality of versions of the plurality of documentation objects for the plurality of versions of the plurality of source files, thus reducing cost of management thereof.

With reference to the first and second aspects, in a second possible implementation of the first and second aspects of the present invention the source file is organized in a plurality of lines and the copy of the marked segment comprises one or more documentation line changes between the version of the source file and a virtual file created by removing the marked segment from the version of the source file. Including in the copy of the marked segment one or more documentation line changes indicative of removing the marked segment from the version of the source file facilitates using existing patch-application development resources, reducing cost of implementation and complexity of a system implemented according to some embodiments described herein. Optionally, the method further comprises applying the one or more documentation line changes to the version of the source file to produce the virtual file. Optionally, the updated segment in the new version of the source file is identified when performing an application of the one or more documentation line changes to the version of the source file, and identifying that the updated segment is different from the marked segment is by failing to perform the application. Optionally, classifying the updated segment comprises: computing at least one source line change between the new version of the source file and the version of the source file; and computing the change classification by analyzing the one or more documentation line changes and the at least one source line change to identify the one or more differences between the updated segment and the copy of the marked segment. Optionally, computing the change classification comprises: classifying each of the one or more documentation line changes as one of a set of line-change classifications by analyzing the one or more documentation line changes and the at least one source line change to identify the one or more differences between the updated segment and the copy of the marked segment, to produce a plurality of line-change classifications; and computing the change classification by analyzing the plurality of line-change classifications. Computing the change classification by analyzing the plurality of line-change classifications increases accuracy of the change classification compared to other methods that classify the updated segment as a whole. Optionally, at least one documentation line change of the one or more documentation line changes is classified as "line change to lint-characters" and computing the change classification further comprises replacing in the copy of the marked segment the at least one documentation line change with an equivalent line of the updated segment.

With reference to the first and second aspects, in a third possible implementation of the first and second aspects of the present invention classifying the updated segment comprises identifying at least one of: a file name of the new version of the source file is different from another file name of the version of the source file, and a file path of the new version of the source file is different from another file path of the version of the source file. Optionally, generating the updated source documentation object further comprises modifying the updated source documentation object using the file name and additionally or alternatively the file path. Identifying a new file name and additionally or alternatively a new file path increase accuracy of the updated digital documentation modified therewith.

With reference to the first and second aspects, in a fourth possible implementation of the first and second aspects of the present invention the source documentation object further comprises a textual description describing the marked segment and generating the updated source documentation object further comprises: identifying at least one token present in the textual description and the one or more differences identified between the updated segment and the copy of the marked segment; identifying in the one or more differences at least one updated token equivalent to the at least one token; and generating an updated textual description by replacing in the textual description the at least one token with the at least one updated token.

With reference to the first and second aspects, in a fifth possible implementation of the first and second aspects of the present invention the set of change classifications consists of "change to lint-characters", "change to an inner block", "updatable single line change", "no change", and "non-updatable change"; and the set of updatable changes consists of "change to lint-characters", "change to an inner block", and "updatable single line change". Optionally, the method further comprises subject to the change classification being "non-updatable change", generating the updated source documentation object using the copy of the marked segment and by marking the copy of the marked segment is obsolete; and subject to the change classification being "no change", generating the updated source documentation object using the copy of the marked segment.

With reference to the first and second aspects, in a sixth possible implementation of the first and second aspects of the present invention the method further comprises: identifying in the VCS at least one other new version of the source file where each of the at least one other new version was added to the VCS after the version of the source file documented in the source documentation object and before the new version of the source file; organizing the at least one other new version of the source file and the new version of the source file in ascending order of addition to the VCS, to produce a sequence of versions of the source file; and in each of a plurality of iterations: performing an identification of when another updated segment in a consecutive version of the source file, immediately following the version of the source file in the sequence of versions of the source file, equivalent to the marked segment, is different from the marked segment; and in response to the identification: classifying the other updated segment as one of a set of change classifications according to one or more differences identified between the updated segment and the copy of the marked segment; and subject to the change classification being a member of a set of updatable changes, generating the updated source documentation object by modifying the copy of the marked segment according to the change classification and the one or more differences; using the consecutive version of the source file as the source file in a next iteration of the plurality of iterations; and using the updated source documentation object as the source documentation object in the next iteration. Generating the updated documentation object in a plurality of iterations increases a likelihood of the change classification being a member of the set of updateable changes and thus increases a likelihood of automatically updating the copy of the marked segment, increasing usability of a system implemented according to the present disclosure.

With reference to the first and second aspects, in a seventh possible implementation of the first and second aspects of the present invention each of the plurality of versions of the source file is associated with a checksum value, and the source documentation object further comprises the respective checksum value associated with the version of the source file.

With reference to the first and second aspects, in an eighth possible implementation of the first and second aspects of the present invention the method further comprises associating the updated source documentation object with the new version of the source file, and documenting the new version of the source file with the updated source documentation object.

With reference to the first and second aspects, in a ninth possible implementation of the first and second aspects of the present invention the method further comprises retrieving from the VCS the version of the source file and the new version of the source file.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIGS. 5A and 5B are flowcharts schematically representing optional flows of operations for classification, according to some embodiments;

Figure 7:
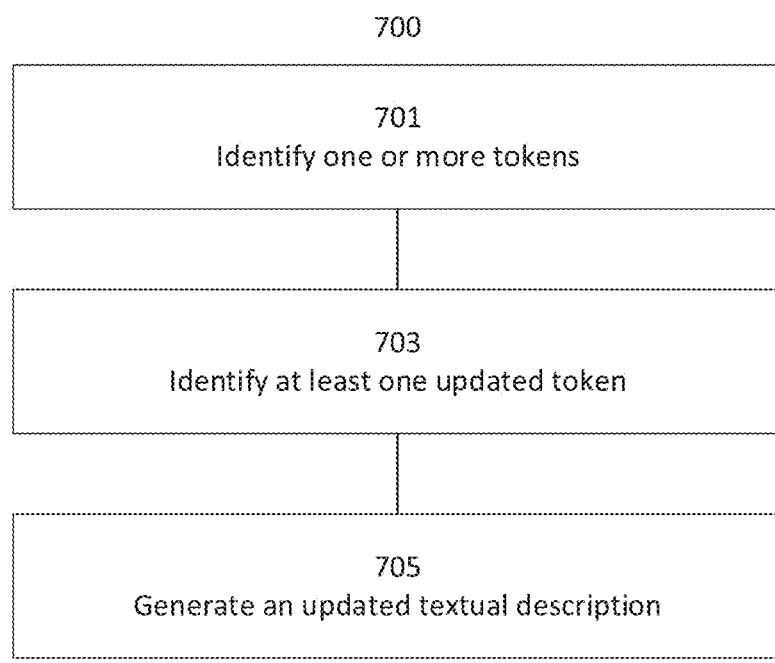

FIGS. 6A, 6B, and 6C are pseudo-code representing optional flows of operations for modifying documentation, according to some embodiments;

FIG. 7 is a flowchart schematically representing an optional flow of operations for updating documentation text, according to some embodiments; and FIGS. 8A and 8B are exemplary screenshots of a development environment, according to some embodiments.

DESCRIPTION OF SPECIFIC EMBODIMENTS
OF THE INVENTION

The following description focuses on, but is not limited to, updating documentation in a software development environment where a plurality of source files is a plurality of software code source files. However, embodiments are not limited to the field of software development. Some other possible embodiments include a plurality of source files that are not software code source files, for example a plurality of test protocols, a plurality of customer service procedures or a plurality of Microsoft Word documents.

Documentation of a plurality of source files of a system that is no longer relevant, for example due to being outdated, may have a negative impact on usage of the system, or of another system generated thereby. In addition, when the plurality of source files is used to create another system, outdated documentation makes it difficult to correctly maintain the other system and additionally or alternatively correctly create it. However, despite long-term costs of poor documentation, manually writing documentation to describe the plurality of source files comes at a cost to developers of the plurality of source files, and frequently offers little immediate benefit. When a plurality of source files of an environment changes frequently, manually updating the documentation in step with the changes to the source files is cumbersome and time consuming, and as a result is often neglected, rendering the documentation irrelevant.

There exist solutions for assisting in creating documentation that automatically generate syntactic documentation providing a syntactic description of one or more structures described by the plurality of source files. For example, in a software development environment, such a solution may generate a set of interface functions, listing for each its arguments and their types. When a definition of an interface function changes, new documentation may be generated. However, some such solutions do not automatically generate semantic documentation explaining the source files, for example explaining how a function operates, and do not update a manually created documentation entry when a source file changes.

There exist other solutions that generate documentation for a plurality of source files of a software program from testing processes of the software program. Such solutions cannot be applied when no testing processes exist, or for source files not covered by the testing processes.

Some other existing solutions insert into the source file a textual token to mark at least part of the source file documented by a manually created documentation entry. In addition, such solutions may digitally sign the documented part of the source file by inserting into the source file a digital signature, for example a hash value computed using the documented part of the source file. However, such solutions modify the source files themselves, making the source files less legible to a user using them. In addition, these solutions are susceptible to problems rising from a user inadvertently corrupting the digital signature or the textual token, for example when modifying the source file for development purposes.

A file version control system (VCS) is a program designed to handle a plurality of versions of one or more files. To allow automatic updating of documentation of a plurality of source files, some embodiments described herewithin propose documenting a marked segment of a version of a source file managed by a VCS using a source documentation object comprising a copy of the marked segment. Optionally, the source documentation object comprises a textual description associated with the marked segment. Optionally, the version of the source file is one of a plurality of versions of the source file, managed by the VCS. When a new version of the source file is identified in the VCS, in such embodiments an updated segment in the new version, equivalent to the marked segment, is classified as one of a set of change classifications and an updated source documentation object is optionally generated by modifying the copy of the marked segment according to the change classification and one or more differences identified between the updated segment and the copy of the marked segment. Some examples of a change classification are "no change", "change to context", "change to an inner block", and "non-updatable changes". Optionally, the updated source documentation object is generated subject to the change classification being a member of a set of updatable changes, for example "change to an inner block". Optionally, classifying the updated segment as one of the set of change classifications is according to the one or more differences between the updated segment and the copy of the marked segment. Modifying the copy of the marked segment according to the change classification increases accuracy of the updated source documentation object compared to generating the updated source documentation object using other methods that apply generic modifications, not adjusted according to the change classification, for example methods that generate syntactic documentation.

Optionally, the source documentation object is associated with the version of the source file comprising the marked segment. Optionally, the updated source documentation object is associated with the new version of the source file, comprising the updated segment equivalent to the marked segment of the version of the source file. Using a VCS to manage the source file allows using one or more VCS values to identify the version of the source file and distinguish the version of the source file from the new version of the source file, for example a respective checksum value associated with each of the source file's plurality of versions. Using the one or more VCS values to identify the version of the source file facilitates using existing development resources, reducing cost of implementation and ease of use of the method described above compared to other methods that rely on proprietary means of associating a version of documentation with a version of a source file. Associating the source documentation object with the version of the source file allows annotating the version of the source file with at least part of the source documentation object, for example in a development environment, for example by displaying at least part of the copy of the marked segment and additionally or alternatively at least part of the textual description associated with the marked segment as an annotation to the marked segment. Similarly, associating the updated source documentation object with the new version of the source file allows annotating the new version of the source file with at least part of the updated source documentation object, increasing accuracy of automatic annotation of each version of the file. Increasing accuracy of automatic annotation of each version of the file increases usability of a development system using the plurality of versions of the plurality of files, for example by increasing legibility of the plurality of versions of the plurality of source files to a human user of the development system.

Optionally, the source documentation object is one of a plurality of source documentation objects, each documenting one of a plurality of marked segments, each marked segment comprising at least part of one of a plurality of versions of one of the plurality of source files. Optionally, the source documentation object documents the entire version of the source file, i.e. the marked segment comprises the entire version of the source file. When the source documentation object documents the entire version of the source file, optionally the source documentation object comprises a link to the version of the source file instead of the marked segment.

As used herewithin, the term "patch" refers to a plurality of differences between two versions of a file organized in a format that describes how to modify one version of the file in order to produce another version of the file. Thus, the term "applying a patch", as used herewithin, refers to applying the one or more changes to the one version of the file in order to produce the other version of the file.

When a file is organized in a plurality of lines, one common format for describing a plurality of differences between a first version and a second version of the file is the context format. In the context format, any changed lines of the second file are shown alongside some unchanged lines before and after, providing a context to the plurality of differences. Such a context serves as a reference to locate in the first file a location for one or more changes to be applied in order to produce the changed lines of the second file. A patch file may be organized in a plurality of hunks, each hunk describing a location in the first file identified by one or more line numbers of the first file and comprising one or more lines of the first version, and an equivalent location in the second file identified by one or more other line numbers of the second file and comprising one or more new lines of the second version. In the context format, the one or more lines of the first version comprise one or more unchanged lines that are the same in both the first file and the second file, and additionally or alternatively one or more removed lines each preceded by a token indicating the line is a line removed from the first version and additionally or alternatively one or more updated lines each preceded by a token indicating the line is a line modified in the second version. In addition, in the context format the one or more lines of the second version comprise the one or more unchanged lines that are the same in both the first file and the second file, and additionally or alternatively one or more added lines each preceded by a token indicating the line is a new line added to the second version and additionally or alternatively one or more new updated lines each preceded by a token indicating the line is a new line modified in the second version from a line of the first version.

Another existing format for describing the plurality of differences between the first version and the second version is the unified differences format. Similar to the context format, in the unified differences format a patch file may be organized in a plurality of hunks, each hunk describing a location in the first file identified by one or more line numbers of the first file, and an equivalent location in the second file identified by one or more other line numbers of the second file. However, in the unified differences format there is no indication of a modified line, and instead a plurality of consecutive modified lines is represented by two changes presented immediately adjacent—removal of a plurality of lines from the first version and addition of a plurality of new lines to the second version.

It is common practice to organize a patch in the unified differences format. To apply such a patch to a file, for each hunk of the plurality of hunks the file must comprise one or more file lines that are equal to the one or more lines of the first file. In some cases, the one or more file lines must be at a file location in the file, the file location identified by the one or more line number in the first file. In such cases, when the file has at the file location one or more file lines that are different from the one or more lines of the first file, the patch cannot be applied as the file is different from the first file.

In some embodiments, the present disclosure additionally proposes organizing the copy of the marked segment as a documentation patch instructing removal of the marked segment from the version of the source file. Such a documentation patch describes one or more documentation line changes between the version of the source file and a virtual file created by removing the marked segment from the version of the source file. Successfully applying such a documentation patch to another version of the source file is indicative of the marked segment being unchanged in the other version of the source file. Thus, in such embodiments, the present disclosure proposes identifying the copy of the marked segment is different from the updated segment subject to a failure to apply the copy of the marked segment as a patch to the new version of the source file. Optionally, applying the copy of the marked segment as a patch is by executing a patch method of the VCS. Using a patch method of the VCS reduces complexity of a system compared to using a proprietary compare method, thus increasing usability.

In addition, it may be the case that after the version of the source file was added to the VCS, more than one other version of the source file was added to the VCS, each at a time of addition to thereof. In some embodiments, the present disclosure additionally proposes organizing the more than one other version in a sequence of versions of the source file, in ascending order of the respective time of addition to the VCS thereof, and generating the updated source documentation object in a plurality of iterations. Optionally, in each of the plurality of iterations the updated source documentation object is generated using a consecutive version of the source file, immediately following the version of the source file in the sequence of the versions of the source file. Optionally, the consecutive version of the source file is used as the source file in a next iteration of the plurality of iterations, and the updated documentation object is used as the source documentation object in the next iteration. Generating the updated documentation object in a plurality of iterations increases a likelihood of the change classification being a member of the set of updateable changes and thus increases a likelihood of automatically updating the copy of the marked segment, increasing usability of a system implemented according to the present disclosure.

In addition, the present disclosure proposes in some embodiments described herewithin, to compute the change classification by analyzing a plurality of line-change classifications, each classifying the one or more documentation line changes as described by the copy of the marked segment of the documentation patch. Computing the change classification by analyzing the plurality of line-change classifications increases accuracy of the change classification compared to analyzing the updated segment as a monolithic block.

For example, a change to an inner block may be one or more changes to a marked segment organized in a plurality of lines where none of the one or more changes are in a first line of the marked segment or in a last line of the marked segment. In this example, a change classification of "change to an inner block" may be determined when identifying that a first and last lines of the copy of the marked segment are respectively equal to the first and last lines of the updated segment. When the one or more differences between the updated segment and the copy of the marked segment are in one or more lines that are not the first or last lines of the copy of the marked segment or the updated segment, there is an increased likelihood that a textual description associated with the marked segment is relevant to the updated segment, and thus the updated source documentation object may be generated using the textual description and the updated segment.

In another example, after determining the change classification is not "change to an inner block", a change classification of "updatable single line change" may be determined when identifying the one or more differences comprise one or more token differences to an amount of tokens of one line of the copy of the marked segment. When an amount of the one or more token differences is below an identified threshold, there is an increased likelihood that the textual description associated with the marked segment is relevant to the updated segment, and thus the updated source documentation object may be generated using the textual description and the updated segment.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, henceforth the term "documentation object" is used to mean "source documentation object", and the terms are used interchangeably.

Figure 1:
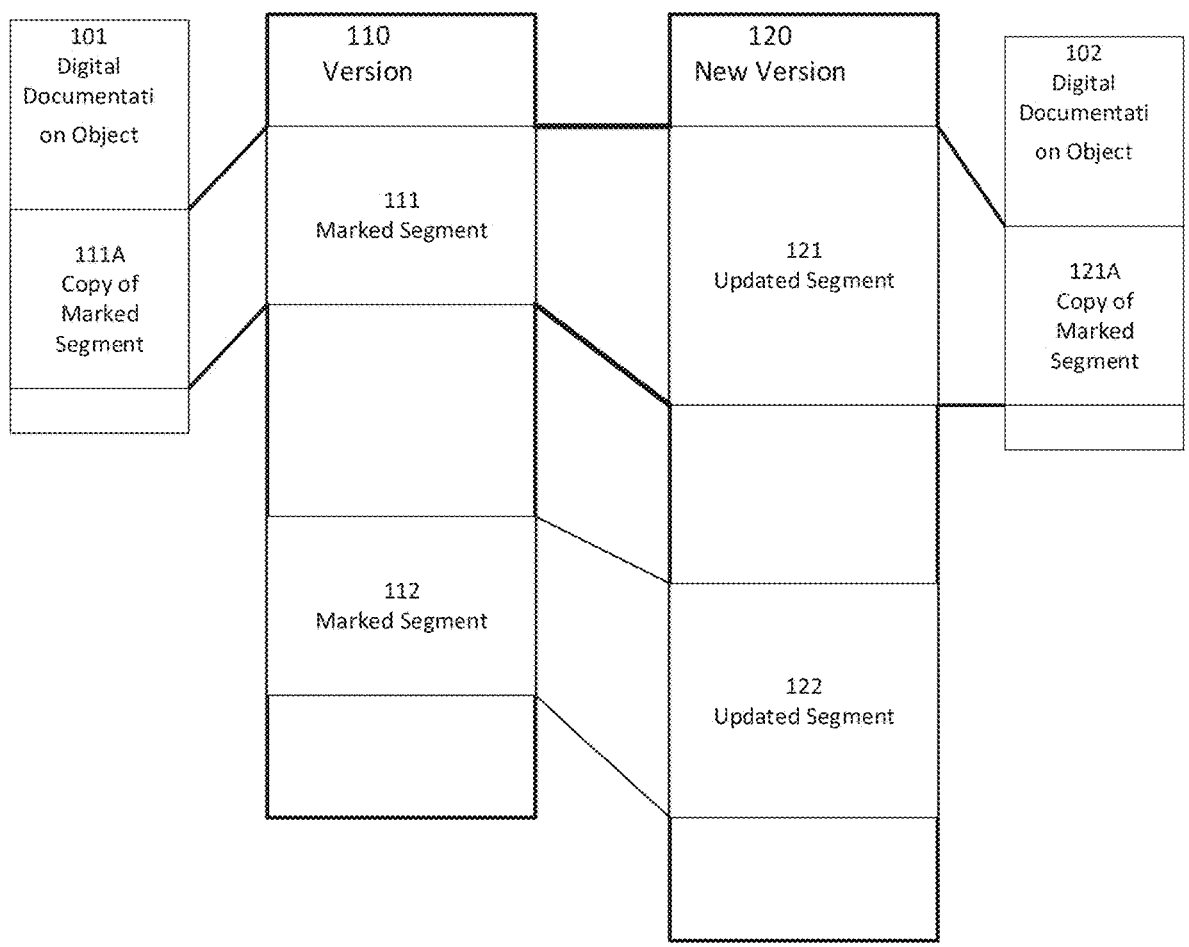
FIG. 1 is a schematic block diagram of exemplary documentation, according to some embodiments.

Reference is now made to FIG. 1, showing a schematic block diagram of exemplary documentation 100, according to some embodiments. In such embodiments, a version of a source file 110 comprises one or more marked segments, for example marked segment 111 and marked segment 112. Optionally, source documentation object 101 documents marked segment 111. Optionally, documentation object 101 comprises a copy of marked segment 111A. When version of the source file 110 is organized in a plurality of lines, the copy of marked segment 111A optionally comprises one or more documentation line changes between the version of the source file and a virtual file created by removing marked segment 111 from version of the source file 110. When marked segment 111 is the entire version of the source file 110, the copy of marked segment 111A optionally comprises a reference to version of the source file 110. Optionally, the copy of marked segment 111A is formatted in unified differences format. Optionally, copy of marked segment 111A comprises one or more unmarked documentation lines preceding, and additionally or alternatively following, marked segment 111 in version of the source file 110.

Optionally, documentation object 101 is one of a plurality of documentation objects, each documenting another marked segment of a plurality of marked segments. For example, another of the plurality of documentation objects may document marked segment 112. Yet another of the plurality of documentation objects may document yet another marked segment, in another file other than the version of the source file 110.

Optionally, new version of the source file 120 is an updated version of version of the source file 110. Optionally, new version of the source file 120 comprises updated segment 121 which corresponds to, i.e. is equivalent to, marked segment 111 of version of the source file 110. Optionally, new version of the source file 120 comprises one or more other updated segments, for example updated segment 122 corresponds to, i.e. is equivalent to, marked segment 112 of version of the source file 110. Optionally, updated segment 122 is located at a line number in new version of the source file 120, different from another line number in version of the source file 110 where marked segment 112 is located therein. Optionally, updated segment 121 is different from marked segment 111. Optionally, new version of source file 120 comprises one or more unchanged documentation lines preceding, and additionally or alternatively following, updated segment 121. Optionally, new version of source file 120 comprises one or more other changed documentation lines preceding, and additionally or alternatively following, updated segment 121.

Optionally, documentation object 101 is not relevant to updated segment 121, for example when documentation object 101 is outdated with respect to updated segment 121. In such embodiments, an updated documentation object 102 is generated, documenting updated segment 121. Optionally, documentation object 102 comprises a copy of updated segment 121A. Optionally, copy of updated segment 121A comprises the one or more unchanged documentation lines preceding, and additionally or alternatively following, updated segment 121. Optionally, copy of updated segment 121A comprises the one or more other changed documentation lines preceding, and additionally or alternatively following, updated segment 121.

Figure 2:
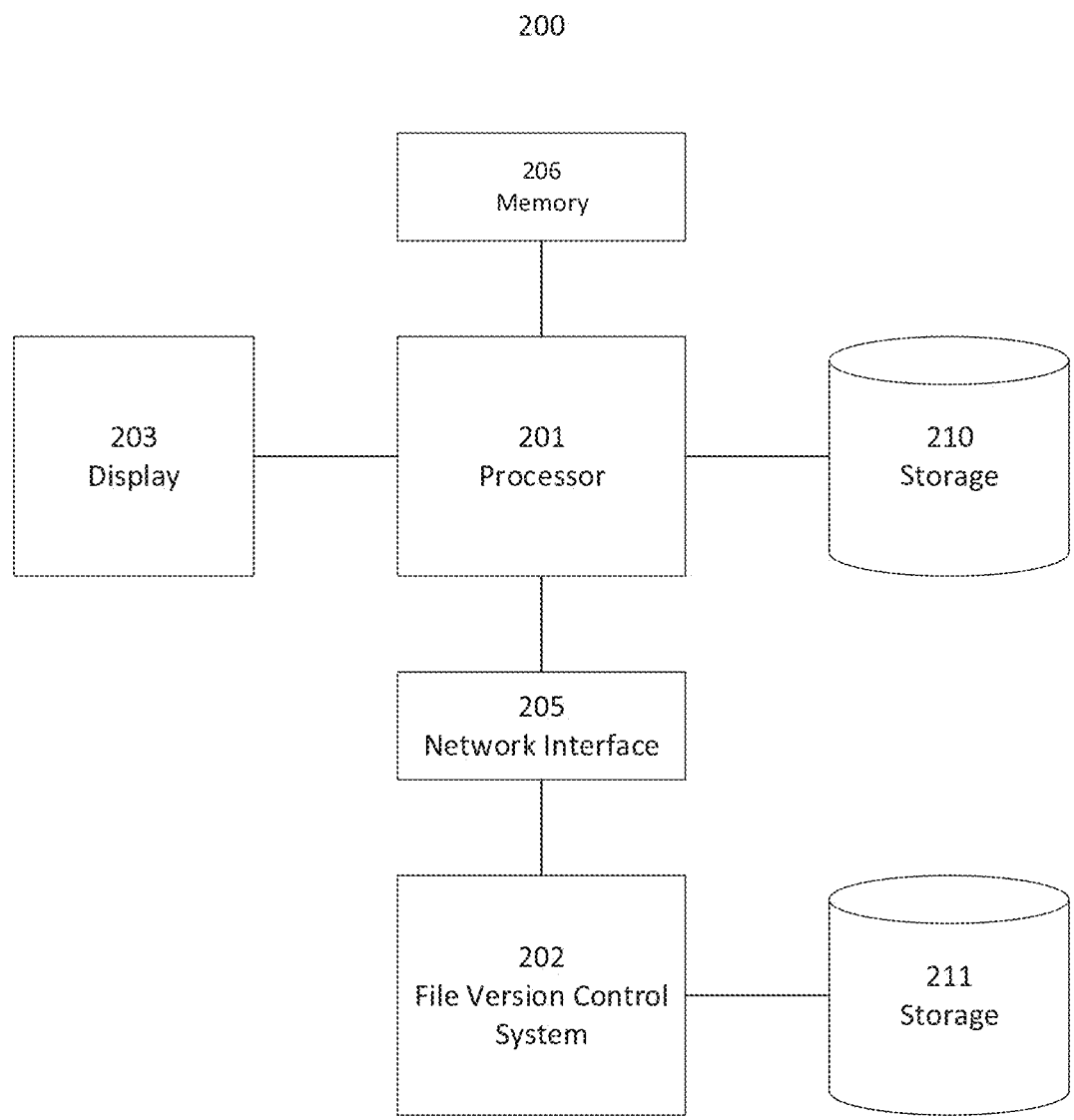
FIG. 2 is a schematic block diagram of an exemplary apparatus, according to some embodiments.

Reference is now made also to FIG. 2, showing a schematic block diagram of an exemplary apparatus 200, according to some embodiments. In such embodiments, apparatus 200 comprises at least one hardware processor 201 connected to file version control system (VCS) 202.

Optionally, VCS 202 is a program executed by at least one other hardware processor, optionally connected to at least one hardware processor 201 via one or more digital communication network interface 205. Optionally, VCS 202 is a program executed by at least one hardware processor 201. Some examples of a VCS are git, Concurrent Versions System (CVS), Apache Subversion (SVN), PVCS Version Manager, IBM Rational, Visual SourceSafe, and Google Drive file versioning.

Optionally, one or more digital communication network interface 205 is connected to a local area network (LAN), for example an Ethernet network or a wireless network. Optionally, one or more digital communication network interface 205 is connected to a wide area network (WAN), for example the Internet.

For brevity, henceforth the term "processing unit" is used to mean "at least one hardware processor" and the terms are used interchangeably.

Optionally, processing unit 201 is connected to memory 206, optionally storing program instructions. Optionally, memory 206 is a non-transitory computer readable storage medium, for example a read only memory (ROM). Optionally, memory 206 is a transitory computer readable storage medium, for example a random access memory (RAM).

Optionally, VCS 202 is connected to one or more non-volatile storage 211, optionally for the purpose of storing a plurality of versions of a plurality of source files managed by VCS 202. Some examples of a non-volatile storage are a hard disk drive (HDD), a solid state drive (SSD), a networked storage and a network connected storage. Optionally, processing unit 201 is connected to one or more non-volatile storage 210, optionally for the purpose of storing a plurality of source documentation objects each documenting one of a plurality of marked segments each from one of the plurality of versions of the plurality of source files. Optionally, one or more non-volatile storage 210 is one or more non-volatile storage 211.

Optionally, processing unit 201 is connected to at least one display device 203, optionally for the purpose of displaying one or more of the plurality of documentation objects. Some examples of a display device are a computer screen, a smartphone screen and a monitor.

Optionally, apparatus 200 is a development environment, for example a software development environment. Optionally, the one or more of the plurality of documentation objects are displayed on at least one display device 203 as annotation of one or more of the plurality of versions of the plurality of source files displayed on at least one display device 203, for example when apparatus 200 is a development environment.

In some embodiments described herewithin, apparatus 200 implements the following method, optionally executed, at least in part, by processing unit 201.

Figure 3:
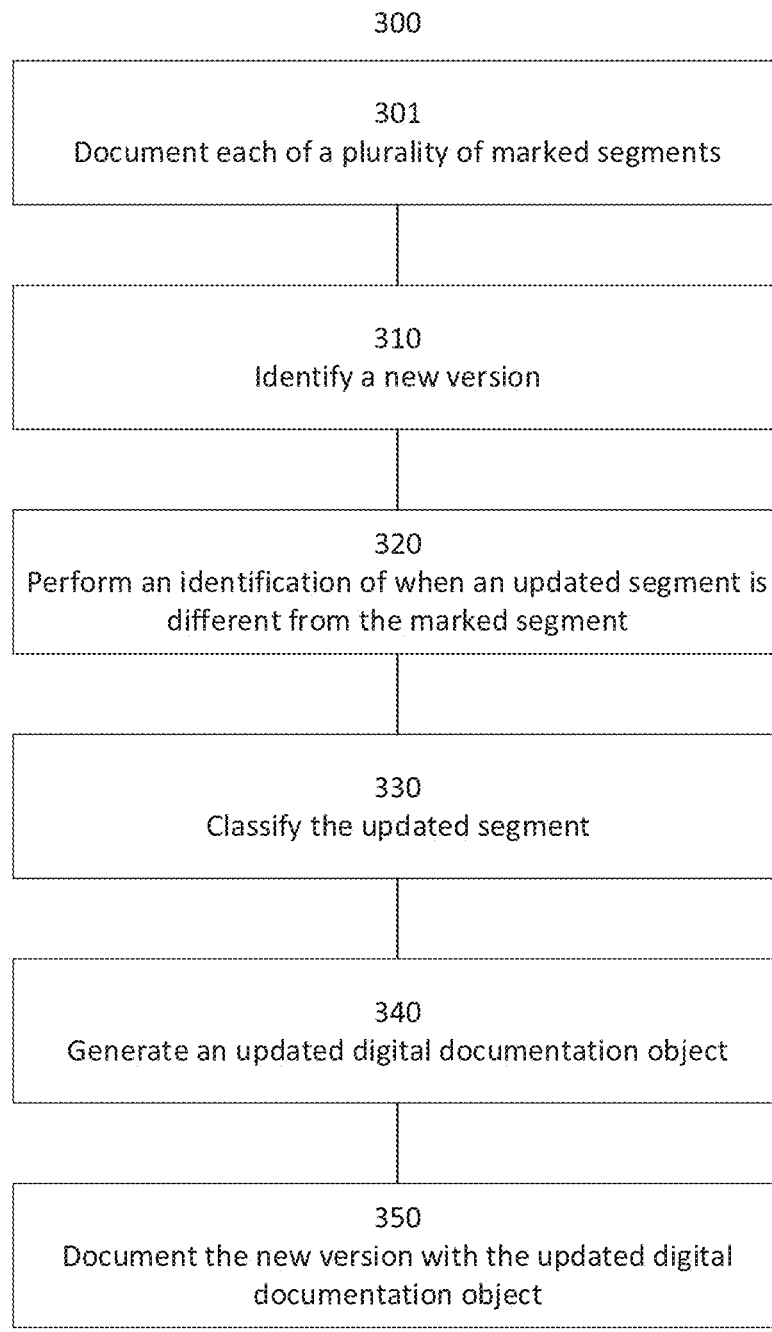
FIG. 3 is a flowchart schematically representing an optional flow of operations for updating documentation, according to some embodiments.

Reference is now made also to FIG. 3, showing a flowchart schematically representing an optional flow of operations 300 for updating documentation, according to some embodiments. In such embodiments, processing unit 201 executes flow of operations 300. Optionally, in 301 processing unit 201 documents each of a plurality of marked segments in one of a plurality of source documentation objects. Optionally, each marked segment comprises at least part of one of a plurality of versions of one of a plurality of source files. In one example, the plurality of source files is a plurality of software program source files. Optionally, at least one of the plurality of source files is formatted according to a schema, for example a HyperText Markup Language (HTML) schema, or a schema of a test procedure. Optionally, each documentation object comprises a copy of the marked segment the documentation object documents.

Optionally, the plurality of source documentation objects is organized in at least one documentation file. Optionally, each of the at least one documentation file has a plurality of documentation versions. Optionally, the plurality of documentation versions of the at least one documentation file is managed by another VCS. Optionally, the other VCS is VCS 202. Optionally, each documentation version of the at least one documentation file in the other VCS is associated with a version of at least one of the plurality of source files. Optionally, a set of documentation entries documenting one version of a source file are organized in one documentation file, optionally using a table. Optionally, each documentation object comprises additional metadata, optionally describing the version of the respective source file documented thereby and additionally or alternatively describing the marked segment documented thereby. For example, when each of the plurality of versions of the source file is associated with a digital signature value, a documentation object may comprise the digital signature value associated with the version of the source file documented thereby. Optionally, the digital signature value is a checksum value, optionally computed using a secure hash algorithm (sometimes known as a SHA value of the version of the source file), a textual description of the marked segment, and a path of the source file of the version of the source file when the plurality of source files is organized in a file directory. Optionally, the digital signature value is a checksum value computed for a plurality of versions of a plurality of source files modified in VCS 202 at an identified time, known also as a commit to VCS 202.

Reference is now made again to FIG. 1. For brevity, henceforth the term "version 110" is used to refer to version of source file 110, and the term "version 120" is used to refer to new version of source file 120, and the terms are used interchangeably respectively.

Reference is now made again to FIG. 3. Optionally, the plurality of source files is managed by VCS 202. For example, VCS 202 may manage, among other files, version of source file 110. In 310, processing unit 201 optionally identifies a new version of a source file of the plurality of source files, for example new version 120. Optionally, new version 120 was added to VCS 202 after version 110 had been added thereto. Optionally, processing unit 201 retrieves version 110 and additionally or alternatively version 120 from VCS 202.

In 320, processing unit 201 optionally performs an identification of when updated segment 121 in new version 120 is different from marked segment 111, where updated segment 121 is equivalent to marked segment 111. Optionally the source file that version 110 and new version 120 are one of a plurality of versions thereof is organized in a plurality of lines. To perform the identification, processing unit 202 optionally computes a mapping between a plurality of line numbers of marked segment 111 in version 110 and a plurality of other line numbers of updated segment 122 in version 120.

In some embodiments, processing unit 201 identifies updated segment 121 is different from marked segment 111 by applying documentation line changes. In such embodiments, processing unit 201 optionally executes the following optional method.

Figure 4:
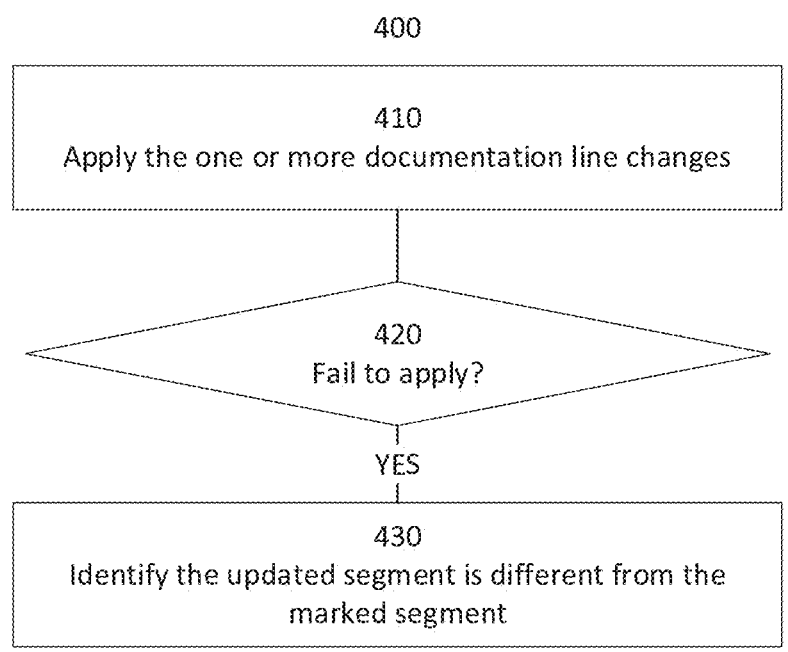
FIG. 4 is a flowchart schematically representing another optional flow of operations, according to some embodiments.

Reference is now made also to FIG. 4, showing a flowchart schematically representing another optional flow of operations 400, according to some embodiments. In such embodiments, in 410 processing unit 201 applies a plurality of documentation line changes of copy of marked segment 111A to new version 120. Optionally, processing unit 201 applies the plurality of documentation line changes using a patch application method of VCS 202, for example git-apply when VCS 202 is a git VCS. Optionally, processing unit 201 identifies updated segment 121, equivalent to marked segment 111, when applying the plurality of documentation line changes to new version 120.

In 420, processing unit 201 optionally identifies a failure to apply the plurality of documentation line changes to new version 120. Optionally, processing unit 201 uses the failure to identify in 430 that updated segment 121 is different from marked segment 111.

In software development, the term "lint" refers to static software analysis of source code for programmatic and stylistic errors. As used herein, the terms "delint" and "applying lint" refer to removal from a text of one or more characters that do not change semantics of the text and thus may be ignored when comparing to another text for purposes of documentation. The term "lint characters" refers to such characters that do not change semantics of the text. Some examples of a lint character are a semicolon, a comma, a space, a new line character, a tab character, a form feed character, a carriage return character, and a vertical tab character. In some cases, applying lint to a text comprises replacing single quotes by double quotes or by back-quotes. In some other cases, applying lint to a text comprises replacing double quotes by single quotes or by back-quotes. In yet some other cases, applying lint to a text comprises replacing back-quotes by single quotes of back double quotes.

Reference is now made again to FIG. 3. In response to the identification in 320, in 330 processing unit 201 optionally classifies updated segment 121 as one of a set of change classification. Some examples of a change classification include, but are not limited to: "change to lint-characters", "change to an inner block", "updatable single line change", "no change", "change to context", and "non-updatable change". Optionally, some change classifications indicate an ability to automatically update related documentation. Some examples of updatable changes include, but are not limited to, "change to lint-characters", "change to an inner block", and "updatable single line change".

Optionally processing unit 201 classifies updated segment 121 according to one or more differences identified between updated segment 121 and copy of marked segment 111A.

Reference is now made also to FIG. 5A, showing a flowchart schematically representing an optional flow of operations for classification 500, according to some embodiments. In such embodiments, to classify updated segment 121, in 501 processing unit 201 computes one or more source line changes between new version 120 and version 110. Optionally, to compute the one or more source line changes, processing unit 201 computes a mapping between a plurality of line numbers of marked segment 111 in version 110 and another plurality of line numbers of updated segment 121 in version 120. Optionally, processing unit 201 computes the one or more source line changes by applying a compare method, for example Myers Diff algorithm. Optionally, the compare method is executed via VCS 202. Optionally, in 503, processing unit 201 computes the change classification by analyzing the one or more documentation line changes of copy of marked segment 111A and the one or more source line changes to identify the one or more differences between updated segment 121 and copy of marked segment 111A.

Reference is now made also to FIG. 5B, showing a flowchart schematically representing another optional flow of operations for classification 510, according to some embodiments. In such embodiments, in 511 processing unit 201 classifies each of the one or more documentation line changes as one of a set of line-change classifications. Some examples of a line-change classification are: ADDITION, DELETION, UPDATE, CONTEXT, and NO CHANGE. Optionally, in 511 processing unit 201 analyzes the one or more documentation line changes and the one or more source line changes to identify the one or more differences between updated segment 121 and copy of marked segment 111A, to produce a plurality of line-change classifications.

In 515, processing unit 201 optionally computes the change classification by analyzing the plurality of line-change classifications.

Optionally, before classifying updated segment 121 processing unit 201 generates a dynamic patch file using a set of description objects documenting one or more marked segments in file version 110. Optionally, the dynamic patch file comprises an array of hunk containers, each computed using one of the set of description objects and organizing one or more of: the plurality of line-change classifications, the one or more documentation line changes, and the one or more source line changes.

Reference is now made again to FIG. 3. In 340, processing unit 201 optionally generates updated source documentation object 102. Optionally, processing unit 201 generates updated source documentation object 102 subject to the change classification computed in 330 being a member of a set of updateable changes. Optionally, processing unit 201 generates updated documentation object 102 by modifying copy of marked segment 111A according to the changes classification and the one or more differences.

Optionally, 330 and 340 are combined, and copy of marked segment 111A is modified while classifying updated segment 121. Reference is now made also to FIG. 6A, showing pseudo-code representing an optional flow of operations 600 for modifying documentation, according to some embodiments. As used in henceforth, the term "inner context" refers to one or more lines of copy of marked segment 111A which are changed in updated segment 121 and each comprise at least one character that is not a whitespace character. In addition, as used henceforth, the terms "side A" and "side B" refer respectively to item A and item B of a file comparison method, for example, Myer Diff Algorithm. Optionally, side A refers to version 110 and side B refers to updated version 120. In such embodiments, method 600 is used when classifying updated segment 121 as "change to lint-characters". Optionally, analyzing the plurality of line-change classifications comprises applying lint to copy of marked segment 111A and the one or more source line changes, optionally producing copy of updated segment 121A, optionally for producing updated documentation object 102.

Reference is now made also to FIG. 6B, showing pseudo-code representing another optional flow of operations 610 for modifying documentation, according to some embodiments. In such embodiments, method 610 is used when classifying updated segment 121 as "change to an inner block". Optionally, analyzing the plurality of line-change classifications comprises replacing one or more lines of copy of marked segment 111A with one or more other lines of updated segment 121, optionally producing copy of updated segment 121A, optionally for producing updated documentation object 102.

Reference is now made also to FIG. 6C, showing pseudo-code representing yet another optional flow of operations 620 for modifying documentation, according to some embodiments. In such embodiments, method 620 is used when classifying updated segment 121 as "updatable single line change". Optionally, analyzing the plurality of line-change classifications comprises replacing one line of copy of marked segment 111A with an equivalent line of updated segment 121, optionally producing copy of updated segment 112A, optionally for producing updated documentation object 102. Optionally, method 620 is applied after failing to classify updated segment 121 as "change to an inner block".

Reference is now made again to FIG. 3.

Optionally, generating updated documentation object 102 additionally, or alternatively, comprises processing unit 201 modifying copy of marked segment 111A according to the one or more unchanged documentation lines preceding, and additionally or alternatively following, updated segment 121. Optionally, generating updated documentation object 102 additionally, or alternatively, comprises processing unit 201 modifying copy of marked segment 111A according to the one or more other changed documentation lines preceding, and additionally or alternatively following, updated segment 121.

Optionally, generating updated documentation object 102 additionally, or alternatively, comprises processing unit 201 modifying one or more line numbers of copy of marked segment 111A in version 110 according to one or more other line numbers of updated segment 121 in version 120.

It may be that a source file's name was changed. Optionally, classifying updated segment 121 comprises identifying a file name of new version 120 is different from another file name of version 110, i.e. identifying a rename. Optionally, identifying the file name of new version 120 is different from the other file name of version 110 comprises identifying a plurality of removed files removed from VCS 202 and a plurality of added files added to VCS 202. Optionally, identifying the rename further comprises organizing the plurality of removed files and the plurality of added files in pairs, each comprising one of the plurality of added files and one of the plurality of removed files. Optionally, identifying the rename further comprises computing a plurality of similarity scores, one for each pair, and indicative of a degree of similarity between the pair. Optionally, a pair having a similarity score exceeding a threshold similarity score is considered a rename of a file.

It may be that the source file was moved in a file directory according to which the plurality of source files is organized. Optionally, classifying updated segment 121 comprises identifying a file path of new version 120 is different from another file path of version 110. When source documentation object 101 comprises the other file name of version 110 and additionally or alternatively the other file path of version 110, updated documentation object 102 is optionally modified using the file name of version 120 and additionally or alternatively the file path of version 120.

Optionally, documentation object 101 comprises a textual description describing marked segment 111. Reference is now made also to FIG. 7, showing a flowchart schematically representing an optional flow of operations 700 for updating documentation text, according to some embodiments. In such embodiments, in 701 processing unit 201 identifies one or more tokens present in the textual description. Optionally, processing unit 201 identifies the one or more tokens in the one or more differences identified between updated segment 121 and copy of marked segment 111A. For example, when the source file is a source code file of a software program, a token may be a function name or a name of an argument of a function. Optionally, a token is a file name or a module name. In 703, processing unit 201 optionally identifies in the one or more differences one or more updated tokens, equivalent to the one or more tokens identified in 701. Optionally, to identify the one or more updated tokens, processing unit 201 links at least one filename identified in the documentation text with an object describing a version of the plurality of versions of the source file. Optionally, when a source file is renamed, processing unit 201 updates the object according to a new filename of the source file. In 705, processing unit 201 optionally generates updated documentation object 102 by replacing in the textual description the one or more tokens with the one or more updated tokens.

Reference is now made again to FIG. 3.

When the change classification is "non-updatable change", processing unit 201 optionally generates updated documentation object 102 using copy of marked segment 111A and by marking copy of marked segment 111A as obsolete, optionally in updated documentation object 102.

When the change classification is "no change" or "change to context", processing unit 201 optionally generates updated documentation object 102 using copy of marked segment 111A. Optionally, processing unit 201 associates documentation object 101 with new version 120.

In 350, processing unit 201 optionally documents new version 120 with updated source documentation object 102, for example by adding to updated documentation object 102 a new digital signature value computed using new version 120.

Optionally, processing unit 201 identifies in VCS 202 one or more other new versions of the source file of version 110, where each of the one or more other new versions was added to VCS 202 after version 110 and before new version 120.

Optionally, processing unit 201 produces a sequence of versions of the source file by organizing the one or more other new versions in ascending order of addition to the VCS. Optionally, processing unit 201 generates updated documentation object 102 in a plurality of iterations, each time using two consecutive files in the sequence of versions. Optionally, in each of the plurality of iterations, processing unit 201 repeats 320, 330 and 340, using a consecutive version of the source file, immediately following version 110 in the sequence of versions, as new version 120 in a first iteration of the plurality of iterations. Optionally, in each of the plurality of iterations, processing unit 201 uses the consecutive version as version 110 in a next iteration of the plurality of iterations. Optionally, in each of the plurality of iterations, processing unit 201 uses updated source documentation object 102 as documentation object 101 in the next iteration.

In some embodiments, a software program product comprises memory 206 storing program instructions for executing method 300. Optionally, processing unit 201 executes the program instructions from memory 206. Optionally, the software program product is a plug-in module for an integrated development environment (IDE).

Reference is now made also to FIGS. 8A and 8B, showing exemplary screenshots of a development environment, according to some embodiments. With reference to FIG. 8A, in such embodiments, when a user selects one or more versions of one or more source files, screenshot 800 is displayed to show marked segment 801, marked segment 802 and marked segment 803 of the one or more versions of the one or more source files. Optionally, marked segment 801, marked segment 802 and marked segment 803 are from one version of one source file. Optionally, screenshot 800 is displayed on display 203, optionally by processing unit 201. Optionally, a first source documentation object associated with marked segment 801 comprises documentation text 820, in this example including the text "In this step we define the value in config.py". Optionally, processing unit 201 displays documentation text 820 as an annotation to marked segment 801. Optionally, indication 810 shows that the first source documentation object is up-to-date and relevant to marked segment 801.

Similarly, indication 811 optionally shows that a second source documentation object, associated with marked segment 802, is up-to-date and relevant to marked segment 802. Further similarly, indication 812 optionally shows that a third source documentation object, associated with marked segment 803, is up-to-date and relevant to marked segment 803.

When one or more new versions of the one or more source files are available, processing unit 201 optionally executes method 300. For example, in the one or more new versions marked segment 801 may be modified to produce updated segment 801A and marked segment 803 may be modified to produce updated segment 803A. Optionally marked segment 802 is unmodified. Optionally, an outcome of executing method 300 is a first updated source documentation object associated with updated segment 801A comprising an indication of a failure to automatically update the documentation. Optionally, another outcome of executing method 300 is a second updated source documentation object associated with marked segment 802 comprising a copy of marked segment 802 copied from the second source documentation object, and a third updated source documentation object associated with updated segment 803A comprising an indication that third updated source documentation object comprises a copy of updated segment 803A, automatically generated by execution of method 300.

With reference to FIG. 8B, after execution of method 300, in such embodiments when the user selects the one or more new versions of the one or more source files, screenshot 800A is displayed to show updated segment 801A, marked segment 802 and updated segment 803A of the one or more new versions of the one or more source files. Optionally, indication 810 now shows that the first updated source documentation object is no longer up-to-date with reference to updated segment 801.

On the other hand, in screenshot 800A indication 811 optionally shows that the second updated source documentation object, associated with marked segment 802, is up-to-date and relevant to marked segment 802. In addition, in screenshot 800A, indication 812 optionally shows that the third updated source documentation object, associated with marked segment 803, was automatically generated and is up-to-date and relevant to updated segment 803A. It should be noted that in this example a change in line number between marked segment 803 and updated segment 803A does not prevent automatic generation of the third updated source documentation object to be up-to-date and relevant to updated segment 803A. In addition, in this example a change in file name does not prevent automatic generation of the third updated source documentation object to be up-to-date and relevant to updated segment 803A.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant source documentation objects will be developed and the scope of the term source documentation object is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method comprising:
   executing a code in a development environment comprising a file version control system (VCS) for:
      documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
      identifying in the VCS a new version of a source file of the plurality of source files, where the new version was added to the VCS after a version of the source file having a marked segment documented by a source documentation object of the plurality of source documentation objects;
      performing an identification of when an updated segment in the new version of the source file, equivalent to the marked segment, is different from the marked segment; and
      in response to the identification:
         classifying the updated segment as one of a set of change classifications according to one or more differences identified between the updated segment and the copy of the marked segment; and
         subject to the change classification being a member of a set of updatable changes, generating an updated source documentation object by modifying the copy of the marked segment according to the change classification and the one or more differences;
   wherein the plurality of source documentation objects is organized in at least one documentation file each having a plurality of documentation versions;
   wherein the plurality of documentation versions of the at least one documentation file is managed by another VCS; and
   wherein each documentation version of the at least one documentation file in the other VCS is associated with a version of at least one of the plurality of source files in the VCS.

2. A method comprising:
   executing a code in a development environment comprising a file version control system (VCS) for:
      documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
      identifying in the VCS a new version of a source file of the plurality of source files, where the new version was added to the VCS after a version of the source file having a marked segment documented by a source documentation object of the plurality of source documentation objects;
      performing an identification of when an updated segment in the new version of the source file, equivalent to the marked segment, is different from the marked segment; and
      in response to the identification:
         classifying the updated segment as one of a set of change classifications according to one or more differences identified between the updated segment and the copy of the marked segment; and
subject to the change classification being a member of a set of updatable changes, generating an updated source documentation object by modifying the copy of the marked segment according to the change classification and the one or more differences;
wherein the source file is organized in a plurality of lines; and
wherein the copy of the marked segment comprises one or more documentation line changes between the version of the source file and a virtual file created by removing the marked segment from the version of the source file.

3. The method of claim 2, further comprising applying the one or more documentation line changes to the version of the source file to produce the virtual file;
wherein the updated segment in the new version of the source file is identified when performing an application of the one or more documentation line changes to the version of the source file; and
wherein identifying that the updated segment is different from the marked segment is by failing to perform the application.

4. The method of claim 3, wherein classifying the updated segment comprises:
computing at least one source line change between the new version of the source file and the version of the source file; and
computing the change classification by analyzing the one or more documentation line changes and the at least one source line change to identify the one or more differences between the updated segment and the copy of the marked segment.

5. The method of claim 4, wherein computing the change classification comprises:
classifying each of the one or more documentation line changes as one of a set of line-change classifications by analyzing the one or more documentation line changes and the at least one source line change to identify the one or more differences between the updated segment and the copy of the marked segment, to produce a plurality of line-change classifications; and
computing the change classification by analyzing the plurality of line-change classifications.

6. The method of claim 5, wherein at least one documentation line change of the one or more documentation line changes is classified as "line change to lint-characters"; and
wherein computing the change classification further comprises replacing in the copy of the marked segment the at least one documentation line change with an equivalent line of the updated segment.

7. The method of claim 1, wherein classifying the updated segment comprises identifying at least one of:
a file name of the new version of the source file is different from another file name of the version of the source file, and
a file path of the new version of the source file is different from another file path of the version of the source file; and
wherein generating the updated source documentation object further comprises modifying the updated source documentation object using the file name and additionally or alternatively the file path.

8. A method comprising:
executing a code in a development environment comprising a file version control system (VCS) for:
documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
identifying in the VCS a new version of a source file of the plurality of source files, where the new version was added to the VCS after a version of the source file having a marked segment documented by a source documentation object of the plurality of source documentation objects;
performing an identification of when an updated segment in the new version of the source file, equivalent to the marked segment, is different from the marked segment; and
in response to the identification:
classifying the updated segment as one of a set of change classifications according to one or more differences identified between the updated segment and the copy of the marked segment; and
subject to the change classification being a member of a set of updatable changes, generating an updated source documentation object by modifying the copy of the marked segment according to the change classification and the one or more differences;
wherein the source documentation object further comprises a textual description describing the marked segment; and
wherein generating the updated source documentation object further comprises:
identifying at least one token present in the textual description and the one or more differences identified between the updated segment and the copy of the marked segment;
identifying in the one or more differences at least one updated token equivalent to the at least one token; and
generating an updated textual description by replacing in the textual description the at least one token with the at least one updated token.

9. A method comprising:
executing a code in a development environment comprising a file version control system (VCS) for:
documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
identifying in the VCS a new version of a source file of the plurality of source files, where the new version was added to the VCS after a version of the source file having a marked segment documented by a source documentation object of the plurality of source documentation objects;

performing an identification of when an updated segment in the new version of the source file, equivalent to the marked segment, is different from the marked segment; and
in response to the identification:
classifying the updated segment as one of a set of change classifications according to one or more differences identified between the updated segment and the copy of the marked segment; and
subject to the change classification being a member of a set of updatable changes, generating an updated source documentation object by modifying the copy of the marked segment according to the change classification and the one or more differences;
method of claim 1, wherein the set of change classifications consists of "change to lint-characters", "change to an inner block", "updatable single line change", "no change", and "non-updatable change"; and
wherein the set of updatable changes consists of "change to lint-characters", "change to an inner block", and "updatable single line change".

10. The method of claim 9, further comprising:
subject to the change classification being "non-updatable change", generating the updated source documentation object using the copy of the marked segment and by marking the copy of the marked segment is obsolete; and
subject to the change classification being "no change", generating the updated source documentation object using the copy of the marked segment.

11. A method comprising:
executing a code in a development environment comprising a file version control system (VCS) for:
documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
identifying in the VCS a new version of a source file of the plurality of source files, where the new version was added to the VCS after a version of the source file having a marked segment documented by a source documentation object of the plurality of source documentation objects;
performing an identification of when an updated segment in the new version of the source file, equivalent to the marked segment, is different from the marked segment;
in response to the identification:
classifying the updated segment as one of a set of change classifications according to one or more differences identified between the updated segment and the copy of the marked segment; and
subject to the change classification being a member of a set of updatable changes, generating an updated source documentation object by modifying the copy of the marked segment according to the change classification and the one or more differences;
identifying in the VCS at least one other new version of the source file where each of the at least one other new version was added to the VCS after the version of the source file documented in the source documentation object and before the new version of the source file;
organizing the at least one other new version of the source file and the new version of the source file in ascending order of addition to the VCS, to produce a sequence of versions of the source file; and
in each of a plurality of iterations:
performing an identification of when another updated segment in a consecutive version of the source file, immediately following the version of the source file in the sequence of versions of the source file, equivalent to the marked segment, is different from the marked segment; and
in response to the identification:
classifying the other updated segment as one of a set of change classifications according to one or more differences identified between the updated segment and the copy of the marked segment; and
subject to the change classification being a member of a set of updatable changes, generating the updated source documentation object by modifying the copy of the marked segment according to the change classification and the one or more differences;
using the consecutive version of the source file as the source file in a next iteration of the plurality of iterations; and
using the updated source documentation object as the source documentation object in the next iteration.

12. A method comprising:
executing a code in a development environment comprising a file version control system (VCS) for:
documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
identifying in the VCS a new version of a source file of the plurality of source files, where the new version was added to the VCS after a version of the source file having a marked segment documented by a source documentation object of the plurality of source documentation objects;
performing an identification of when an updated segment in the new version of the source file, equivalent to the marked segment, is different from the marked segment; and
in response to the identification:
classifying the updated segment as one of a set of change classifications according to one or more differences identified between the updated segment and the copy of the marked segment; and
subject to the change classification being a member of a set of updatable changes, generating an updated source documentation object by modifying the copy of the marked segment according to the change classification and the one or more differences;
wherein each of the plurality of versions of the source file is associated with a checksum value; and wherein the source documentation object further comprises the respective checksum value associated with the version of the source file.

13. The method of claim 1, further comprising:
associating the updated source documentation object with the new version of the source file; and
documenting the new version of the source file with the updated source documentation object.

14. An apparatus comprising at least one hardware processor configured for executing a code in a development environment comprising a file version control system (VCS) for:
documenting each of a plurality of marked segments in one of a plurality of source documentation objects associated therewith, each marked segment comprising at least part of one of a plurality of versions of one of a plurality of source files managed by the VCS, where each source documentation object comprises a copy of the marked segment documented thereby;
identifying in the VCS a new version of a source file of the plurality of source files, where the new version was added to the VCS after a version of the source file having a marked segment documented by a source documentation object of the plurality of source documentation objects;
performing an identification of when an updated segment in the new version of the source file, equivalent to the marked segment, is different from the marked segment; and
in response to the identification:
classifying the updated segment as one of a set of change classifications according to one or more differences identified between the updated segment and the copy of the marked segment; and
subject to the change classification being a member of a set of updatable changes, generating an updated source documentation object by modifying the copy of the marked segment according to the change classification and the one or more differences;
wherein the plurality of source documentation objects is organized in at least one documentation file each having a plurality of documentation versions;
wherein the plurality of documentation versions of the at least one documentation file is managed by another VCS; and
wherein each documentation version of the at least one documentation file in the other VCS is associated with a version of at least one of the plurality of source files in the VCS.

15. The apparatus of claim 14, the code is further for retrieving from the VCS the version of the source file and the new version of the source file.

16. A software program product for a development environment, comprising:
a non-transitory computer readable storage medium;
first program instructions for documenting each of a plurality of marked segments in one of a plurality of source documentation objects associated therewith, each marked segment comprising at least part of one of a plurality of versions of one of a plurality of source files managed by a VCS, where each source documentation object comprises a copy of the marked segment documented thereby;
second program instructions for identifying in the VCS a new version of a source file of the plurality of source files, where the new version was added to the VCS after a version of the source file having a marked segment documented by a source documentation object of the plurality of source documentation objects;
third program instructions for performing an identification of when an updated segment in the new version of the source file, equivalent to the marked segment, is different from the marked segment; and
fourth program instructions for in response to the identification: classifying the updated segment as one of a set of change classifications according to one or more differences identified between the updated segment and the copy of the marked segment; and subject to the change classification being a member of a set of updatable changes, generating an updated source documentation object by modifying the copy of the marked segment according to the change classification and the one or more differences;
wherein the plurality of source documentation objects is organized in at least one documentation file each having a plurality of documentation versions;
wherein the plurality of documentation versions of the at least one documentation file is managed by another VCS;
wherein each documentation version of the at least one documentation file in the other VCS is associated with a version of at least one of the plurality of source files in the VCS; and
wherein the first, second, third and fourth program instructions are executed by at least one computerized processor from the non-transitory computer readable storage medium.

* * * * *